United States Patent
Sumi

(10) Patent No.: US 6,582,789 B1
(45) Date of Patent: Jun. 24, 2003

(54) SURFACE PROTECTIVE FILM AND LAMINATE FORMED THEREFROM

(75) Inventor: Hiroyuki Sumi, Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/857,289

(22) PCT Filed: Sep. 28, 2000

(86) PCT No.: PCT/JP00/06713

§ 371 (c)(1),
(2), (4) Date: Jun. 1, 2001

(87) PCT Pub. No.: WO01/25363

PCT Pub. Date: Apr. 12, 2001

(30) Foreign Application Priority Data

Oct. 1, 1999 (JP) .......................................... 11-281440

(51) Int. Cl.$^7$ .................................................. C09J 7/02
(52) U.S. Cl. ...................... 428/40.1; 428/1.1; 428/40.2; 428/40.5; 428/41.3; 428/41.4; 428/41.5; 428/41.7; 428/41.8; 428/480; 428/906; 428/918
(58) Field of Search .............................. 428/40.1, 40.2, 428/40.5, 41.3, 41.5, 41.4, 41.7, 41.8, 906, 480, 918, 1.1

(56) References Cited

FOREIGN PATENT DOCUMENTS

| | | |
|---|---|---|
| EP | 0 874 015 | 10/1998 |
| JP | 8-259914 | 10/1996 |
| JP | 9-254307 | 9/1997 |
| JP | 9-267449 | * 10/1997 |
| JP | 11-070629 | * 3/1999 |
| JP | 11-291411 | 10/1999 |

* cited by examiner

*Primary Examiner*—Nasser Ahmad
(74) *Attorney, Agent, or Firm*—Sughrue Mion, PLLC

(57) ABSTRACT

A surface protective film which can be used in the production of components associated with a liquid crystal display such as a polarizer to improve productivity and yields since no air bubbles are trapped when stuck to a substrate having unevenness in the surface and since the adhesion is low and a change of the adhesion with the passage of time is small and which can be highly transparent and improve inspectability by using a polyester film having little particles as a base material. It is treated by an antistatic agent or a release agent the surface of the surface protective film opposite to the surface in which the adhesive layer is formed, as a result, control of static electrification in case the surface protective film is peeled off and removal of the dust adhering to the surface can be made easy.

18 Claims, No Drawings

SURFACE PROTECTIVE FILM AND LAMINATE FORMED THEREFROM

TECHNICAL FIELD

The present invention relates to a surface protective film and more specifically to a surface protective film that has an adhesive layer which can be easily peeled off after stuck on a substrate, which has a peel force that does not increase with time and which has no liftings caused by the air bubbles trapped when the film is stuck on a substrate having a rough surface, and further that is so highly transparent that the inspectability of the substrate stuck with it is not impaired.

BACKGROUND ART

A surface protection film is the composition of having used the plastic film as the base film generally, and having prepared the adhesion agent layer in one side of the base film. In recent years, its use for protecting the surface of an optical component has been becoming increasingly popular. For example, in a process for producing a variety of display such as a television, computer, word processor, car navigation system, it is used for protecting the surface of them. Above all, it is used for protecting not only the surface of liquid crystal display (LCD) which has spread rapidly now but also the surfaces of optical components and optical laminates such as a polarizer, optical retardation film and viewing angle-widening film in a process for producing LCD. In general, a transparent film, for example, olefin-based film such as a polyethylene or polypropylene is used as the base film of the surface protective film, and the surface protective film is peeled off and discarded when the production of LCD is complete or when it is actually used.

In recent years, TFT-LCD in particular has been receiving attention due to its high resolution and high-speed response, and the requirements for the surface protective film covering the display during its production process have been made more rigorous. For example, in the process for producing a polarizer or LCD, the product is often inspected for the presence of defects with the surface protective film stuck thereon. It has been difficult to inspect the product itself with high precision, because in the case of the usual olefin-based film such as the polyethylene film, it is no good transparency and has many gels such as fisheyes that maybe particles. And a surface protective film will be stuck in many cases to the following manufacturing process for a long time, once it is stuck on the polarizer or LCD. After inspection had been completed, there was a problem that workability became bad when the surface protective film was peeled off and the peel force was increased after inspection had been completed, or defects, such as generating of the particles and distortion, arose in inspection of the display when a part of adhesive layer remained.

Some of display components such as a polarizer have minute unevenness in the surface to control reflection of light to protect glare on display. Meanwhile, it is generally practiced to be a rigid adhesive layer to have re-release characteristics by reducing the adhesion, for example, by increasing the cohesion of the adhesive or by mixing a large amount of components having a high glass transition temperature (Tg) or hard segments. When the surface protective film which has such an adhesive layer is stuck on the surface in which is prepared unevenness, the portions that cannot contact the adhesive layer with the surface may occur mainly because the adhesive is not fully smeared and does not spread on the surface. As a result, since it becomes air bubbles and remains without air falling out in these portions, it may become a problem at the time of inspection.

In addition, a release film is generally applied to the surface of the adhesive layer of an unused surface protective film at the step of forming the adhesive layer, and the surface protective film is rolled up with the release film to be a final product. However, since the release film is just peeled off and discarded when the surface protective film is used, it is necessary to eliminate the release film in consideration of production of waste and costs.

DISCLOSURE OF THE INVENTION

It is an object of the present invention to provide a surface protective film that has an adhesive layer which can be easily peeled off after stuck on a substrate, which has a peel force that does not increase with time and which has no liftings caused by the bubbles trapped when the film is stuck on a substrate having a rough surface and that is so highly transparent that the inspectability of the substrate stuck with it is not impaired.

It is another object of the present invention to provide a surface protective film having an adhesive layer which leaves no adhesive residues and a smooth adhesive surface.

It is another object of the present invention to provide a roll of a surface protective film which can be rolled up without sticking a release film on the adhesive layer of a surface protective film, if necessary can be easily peeled off a substrate on which is stuck the unrolled surface protective film, has a peel force that does not increase with time, and is so highly transparent that the inspectability of the substrate stuck with it is not impaired.

Other objects and advantages of the present invention will be apparent from the following description.

According to the present invention, firstly, the above objects and advantages of the present invention can be achieved by a surface protective film for protecting the surface of a substrate, which comprises a polyester film (A) and an adhesive layer (B) formed on one surface of the polyester film (A) and has a critical bounce coefficient of not more than 0.5.

The above surface protective film preferably has the following properties and constitution. The adhesive layer (B) satisfies all of the following properties (1) to (4).
(1) The dry adhesion against a stainless steel plate is 30 to 500 mN/25 mm (3 to 50 g/25 mm).
(2) The rate of change in the dry adhesion after kept in a stuck position for a week at 60° C. is 0.5 times to 2.0 times.
(3) The size of a ball used in ball tack measurement is 2/32 inches to 10/32 inches.
(4) The thickness of the adhesive layer (B) is 5 µm to 50 µm.

According to the present invention, secondly, the above objects and advantages of the present invention can be achieved by a film roll in the form of the roll with which the surface protective film of the present invention is rolled round in the state where the adhesive layer (B) and a protective layer (C) are contacted directly.

The present invention will be described in detail hereinafter.

The surface protective film of the present invention comprises at least a polyester film (A) and an adhesive layer (B). Further, a protective layer (C) containing at least either an antistatic agent or a release agent can be formed on the surface reverse to the surface on which the adhesive layer is formed. Further, a release layer (E) can be formed on the adhesive layer (B).

Polyester Film

The base film (layer A) of the surface protective film used according to the present invention is a polyester film, which is excellent in transparency, productivity and workability. The polyester film is not limited to a particular kind but is preferably a polyethylene terephthalate film or a polyethylene-2,6-naphthalenedicarboxylate film. Further, it may take a multi-layer structure obtained by co-extrusion and comprising any number of layers. The polyester constituting the polyester film is preferably a crystalline, linear saturated polyester such as a polyethylene terephthalate, polypropylene terephthalate, polybutylene terephthalate, polyethylene-2,6-naptahlenedicarboxylate, copolymers obtained by substituting portions of these compounds with other components, and mixtures of these compounds with polyalkylene glycol or other resins.

The polyester film used in the present invention may be an unstretched polyester film, a monoaxially oriented polyester film or a biaxially oriented film. The biaxially oriented polyester film is preferable from the viewpoints of productivity and handling properties.

The biaxially oriented polyester. film can be produced by a conventionally known method such as a sequential biaxially stretching method, simultaneous biaxially stretching method or the like. For example, the sequential biaxially stretching method can be carried out in the following manner. The above polyester polymer is fully dried and then extruded from a die (such as a T-die or I-die) onto a cooling drum by melt extrusion method. The extruded polymer is quenched to produce an unstretched film or co-extruded unstretched film, which is in turn stretched in the longitudinal direction at temperatures of 60 to 140° C. and then in the transverse direction at temperatures of 80 to 150° C. and finally heat-set at temperatures of 160 to 260° C. for 1 to 100 seconds to produce the biaxially oriented polyester film. The heat setting can be carried out under limited shrinkage. Further, it is preferable to employ electrostatic adhesion method when the melt extrusion is carried out.

The biaxially oriented polyester film (A) is preferably isotropic to have no rupture in a particular direction, and the difference ($N_{TD}-N_{MD}$) between the refractive index in the transverse direction ($N_{TD}$) and the refractive index in the machine direction ($N_{MD}$) is preferably more than –0.08 and less than 0.08. The terms "machine direction" indicate a direction parallel to the film-producing direction, and the terms "transverse direction" indicate a direction perpendicular to the film thickness direction. The transverse direction may also be called "the width direction" in the following description.

When the difference ($N_{TD}-N_{MD}$) between the refractive index in the transverse direction ($N_{TD}$) and the refractive index in the machine direction ($N_{MD}$) is not more than –0.08 or not less than 0.08, and when excessive stress is applied in the transverse direction or the machine direction of the biaxially oriented film while the film protects the adhesive layer by sticking via the adhesive layer on the polarizer or the like, the film is deformed, whereby air may come into the deformed portions or the workability that is peeled the adhesive layer off the protected polarizer or the like may be bad. The difference ($N_{TD}-N_{MD}$) is preferably more than –0.05 and less than 0.05 in particular. Such a biaxially oriented polyester film should have almost the same stretch ratio in the above-mentioned machine and transverse directions, and the stretch ratio in the above-mentioned machine and transverse directions is preferably 2 to 5 times, particularly preferably 2.5 to 4.5 times.

The monoaxially oriented polyester film can be produced by stretching a film only either in the machine direction or in the transverse direction in the above method.

The thickness of the film is not limited to a particular value but is preferably 5 to 500 μm. It is more preferably 10 to 200 μm for the purpose of improving workability such as sticking and productivity.

The polyester film may contain lubricants, for example, fine inorganic particles such as calcium carbonate, alumina, kaolin, silica, titanium oxide, barium sulfate and zeolite; and fine organic particles such as silicone resin, crosslinked polystyrene and acrylic resin, for the purpose of improving the slip properties of the film while rolling up and its handling properties while converting such as adhesive-coating. Particularly preferable are particles of silica such as spherical silica or porous silica. The polyester film may further contain other additives such as stabilizers, ultraviolet absorbers, flame-retardants and antistatic agents. The particles and additives may be added at any step before the polyester film is produced, for example, at the polymerization step, or at the film production step.

The polyester film (A) in the present invention preferably has a centerline average surface roughness (Ra) in the range from 2 to 500 nm. In case the Ra is less than 2 nm, the film may have a problem associated with carry property that it is not slippy enough during the process, while in case the Ra is more than 500 nm, it is concerned that it is difficult to inspect because the transparency of the film becomes lower, or that the adhesive layer (B) cannot be stuck on the polyester film (A) uniformly due to unevenness on the surface of the film (A) when the adhesive layer (B) is formed thereon by a transfer method.

Further, the said polyester film (A) preferably has 10 or less particles of 5 μm or more and less than 25 μm and has no particles of 25 μm or more in an area (310.8 $cm^2$) of 210 mm×148 mm. When the particles of 25 μm or more exist, voids or the like may be produced at the time of coating or transferring the adhesive, therefore it may be local defects as large as can be found by viewing because the adhesive is devoid or protruded larger than the particle size at the point of voids. When the particles of 5 μm or more and less than 25 μm exist more than 10, it may be difficult to observe the size of the particles but defects caused by them may be conspicuous.

The polyester film (A) according to the present invention has preferably the difference ($N_{TD}-N_{MD}$) between the refractive index in the transverse direction ($N_{TD}$) and the refractive index in the machine direction ($N_{MD}$) of not less than 0.08 in view of inspectability.

When the difference ($N_{TD}-N_{MD}$) between the refractive index in the transverse direction ($N_{TD}$) and the refractive index in the machine direction ($N_{MD}$) is 0.08 or more, in the case of 30~40 μm of the thickness of the polyester film (A) according to the present invention, it can be reduced of interference in visual inspection because retardation becomes sufficiently large whereby the concentration of interference colors extremely lowers. When the difference ($N_{TD}-N_{MD}$) is less than 0.08, it may become interference in visual inspection according to interference color because of small retardation. The $N_{TD}-N_{MD}$ may be referred to as "birefringence (Δn)" in the following description. Due to the above reason, the larger the Δn is the more preferable it is, and the Δn is preferably not less than 0.09, particularly preferably not less than 0.10.

The polyester film (A) having an $N_{TD}-N_{MD}$ of not less than 0.08 can be produced by setting a stretch condition in forming the film, in which the upper limit of the stretch ratio in the machine direction is less than 2.0 times, preferably less than 1.8 times and more preferably less than 1.6 times; the lower limit of the stretch ratio in the machine direction is not less than 1.1 times, preferably not less than 1.2 times and more preferably not less than 1.3 times; the lower limit of the stretch ratio in the transverse direction is not less than 4.0 times, preferably not less than 4.2 times and more preferably not less than 4.4 times; and the upper limit of the stretch ratio in the transverse direction is not more than 6.0 times, preferably not more than 5.5 times and more preferably not more than5.0times. In case the stretch ratio in the machine direction is 2.0 or more times or the stretch ratio in the transverse direction is less than 4.0 times, it is difficult for the $N_{TD}-N_{MD}$ or slope angle to remain within the above range. Further, the polyester film (A) having an $N_{TD}-N_{MD}$ of not less than 0.08 preferably has an orientation degree in the machine direction ($N_{MD}$) of not less than 1.550. In case the said $N_{MD}$ is less than 1.550, when the polyester film (A) protects the adhesive layer by sticking via the adhesive layer on the polarizer or the like, the biaxially oriented film tends to extend to the machine direction. As a result, air may come into the deformed portions of the film, or the workability in the peeling process may be bad because the biaxially oriented film is excessive deformed in case the adhesive layer is peeled off the protected polarizer or the like. Due to the above reasons, the particularly preferable orientation degree ($N_{MD}$) in the machine direction of the biaxially oriented film is 1.580 or more.

Adhesive Layer (B)

An adhesive layer is laminated on the one side of the polyester film (A). This adhesive is preferably an acrylic adhesive, because it is considered that the surface protective film may be left not only indoors but also outdoors and the adhesive must resist a variety of light beams, particularly ultraviolet light, at the time of inspection and further it must be prevented that the components of the adhesive layer migrate into a substrate on which the adhesive layer is stuck.

Some of liquid crystal display components including a polarizer have minute unevenness in the surface to control reflection of light to protect glare on display. In order for the adhesive layer of the surface protective film to sufficiently spread out and wet on the uneven surface for preventing air from remaining as air bubbles, the adhesive layer is preferably made soft to some extent. As an index of the softness, a critical bounce coefficient is used. The surface protective film of the present invention has an adhesive layer having a critical bounce coefficient of not more than 0.5. When the critical bounce coefficient is more than 0.5, this indicates that the adhesive layer is too hard, and when the surface protective film is stuck on liquid crystal display components having minute unevenness in the surface, air may be trapped between unevenness and it may become easy to produce air bubbles, as a result, there is a possibility of causing trouble to inspectability. The critical bounce coefficient is measured by sticking the surface protective film on a glass plate via the adhesive layer and allowing an iron ball to free-fall on the reverse side of the adhesive layer. The critical bounce coefficient is defined by measuring a critical bounce coefficient for each of iron balls having different diameters, plotting the critical bounce coefficient against the cube of the diameter and extrapolating the diameter to zero.

The thickness of the adhesive layer of the surface protective film is preferably 3 to 50 $\mu$m, particularly preferably 5 to 50 $\mu$m. When the thickness is less than 3 $\mu$m, in case the surface protective film is stuck on the uneven polarizer or the like, the hardness of the surface protective film may be dominated the hardness of the polyester film as base film. Therefore, the adhesive does not sufficiently spread out and wet the surface of the polarizer and necessary adhesion cannot be obtained. As a result, local liftings are liable to occur when the surface protective film is stuck on the polarizer. Furthermore, when the thickness is less than 5 $\mu$m, in case the surface protective film is stuck on the uneven polarizer or the like, the hardness of the surface protective film may be dominated the hardness of the polyester film as base film. Therefore, the adhesive does not sufficiently spread out and wet the surface of the polarizer and necessary adhesion cannot be obtained. As a result, local liftings may occur when the surface protective film is stuck on the polarizer. As mentioned above, the thickness is particularly preferably 5 $\mu$m or more. When the thickness is more than 50 $\mu$m, the adhesion may become higher than necessary, or in case the adhesion is coated the control of the thickness and hardening, and further a cost of the adhesive may become problems.

Since the surface protective film according to the present invention must be easily peeled off a substrate such as a polarizer or stainless steel plate, the dry adhesion against a stainless steel plate of the adhesive layer is preferably 30 mN/25 mm to 500 mN/25 mm. In the present invention, the adhesion of 1 mN/25 mm is converted to the adhesion of 0.1 g/25 mm. Therefore, 30 mN/25 mm is equal to 3 g/25 mm, and 500 mN is equal to 5 g/25 mm. In case the dry adhesion is less than 30 mN/25 mm, the sides of the surface protective film may curl up or the film may be easily peeled off for some reason disadvantageously. On the other hand, in case the dry adhesion is more than 500 mN/25 mm, the surface protective film is not easily peeled off a polarizer or the like, so that an excessive force which may be inadvertently applied to the polarizer may deform the polarizer disadvantageously.

Further, the rate of change in the dry adhesion of the adhesive layer after it is kept stuck on a stainless steel plate for a week at 60° C. to that before it is kept stuck on the stainless steel plate for a week at 60° C. is preferably 0.5 to 2.0 times. In case the rate of change is less than 0.5 times or more than 2.0 times, the setting and maintenance of peeling of the surface protective film become complicated when the peeling is performed automatically and, in particular, the peeling becomes more difficult to perform as the rate of change becomes larger. In the present invention, the dry adhesion is measured by using a stainless steel plate. This is because while the adhesion to a polarizer or the like depends on the condition of its surface and is difficult to evaluate, the adhesion to a stainless steel plate is easy to evaluate. By controlling the dry adhesion to a stainless steel plate and its rate of change to within the above ranges, a surface protective film having a moderate adhesion to a polarizer or the like and a constant peel force can be obtained.

Further, to measure the tackiness of the adhesive layer in the present invention, the size of a ball used in ball tack measurement is preferably 2/32 to 10/32 inches. In case the ball size is smaller than or equal to 1/32, the adhesive layer has almost no tackiness, so that the sides of the surface protective film may curl up or liftings may occur when the film is stuck on a substrate. In case the ball size is larger than or equal to 11/32, the tackiness increases, whereby the adhesion increases or the adhesive itself becomes so soft that the cohesive strength of the adhesive also decreases and the adhesive may therefore leave residues after the surface protective film is peeled off. After the surface protective film is stuck on a substrate, the film must be peeled off at the subsequent production and assembly step or the final step. If the adhesive cannot be peeled off completely and remains at that point, the adhesive residues will become defects that damage the appearance of a liquid crystal display or the like.

Further, the adhesive layer in the present invention preferably moves only 0 to 1 mm in an hour when its holding power is measured under a load of 1 kg and at a temperature of 80° C. To prevent the surface protective film from moving with time after stuck on a substrate, a movement of not more than 1 mm in an hour when the holding power is measured under a load of 1 kg and at a temperature of 80° C. is also preferable. In case the movement is more than 1 mm, the surface protective film may move easily with time after stuck on a substrate, which is not preferable from the viewpoints of workability and inspectability.

Further preferably, there are no adhesive residues of size 1 mm$^2$ or larger in an area of 100 cm$^2$ on the surface of a stainless steel plate on which the adhesive layer of the present invention has been kept stuck at 80° C. for a week. After the surface protective film is stuck on a substrate, the film must be peeled off at the subsequent production and assembly step or the final step, if then the adhesive cannot be peeled off completely and remains at that point, the adhesive residues may become defects that damage the appearance of a liquid crystal display or the like. Therefore preferably, there are no adhesive residues of size 1 mm$^2$ or larger in an area of 100 cm$^2$ on the surface of a stainless steel plate on which the adhesive layer of the present invention has been kept stuck at 80° C. for a week. In case one or more of the adhesive residues of size 1 mm$^2$ or larger are present, they may become defects that interfere with inspection or that damage the appearance of a liquid crystal display product.

Further, the adhesive layer in the present invention preferably has the following properties, that is, a glass transition temperature of –60° C. to –20° C., a modulus in tension of 0.1 MPa to 0.2 MPa and a surface tension of 15 $\mu$N/cm to 25 $\mu$N/cm, in order to improves its property that it can be easily stuck on and easily peeled off a protected surface (a polarizer, stainless steel plate or the like).

In case the glass transition temperature (Tg) of the adhesive layer is lower than –60° C. or its modulus in tension is smaller than 0.1 MPa, even under ordinary circumstances including room temperature the adhesive layer becomes so soft that the adhesive spreads out and wet more than necessary on the surface which is protected by the adhesive layer stuck on. Therefore, the adhesive layer tends to have an excessively enhanced adhesion and poor release characteristics. On the other hand, in case the glass transition temperature of the adhesive layer is higher than –20° C. or its modulus in tension is larger than 0.2 MPa, the adhesive layer may be not soft enough to sufficiently spread out and wet a protected surface on which the adhesive layer has been stuck. In case the surface tension of the adhesive layer is lower than 15 $\mu$n/cm, the adhesive layer cannot have a desired adhesion against a protected surface on which the adhesive layer is stuck. On the other hand, in case the surface tension of the adhesive layer is higher than 25 $\mu$n/cm, the adhesive layer is liable to have an excessive adhesion against the protected surface and poor release characteristics.

Further, the adhesive layer preferably has a centerline average surface roughness (Ra) of 2 nm to 500 nm. When the Ra is larger than 500 nm, in case the adhesive layer is tried to stick a polarizer or the like, the adhesive layer cannot be stuck completely in spite of its softness, so it may become problems that the surface protective film is distorted or that air bubbles are generated into the portions of the dent of the substrate. The centerline average surface roughness (Ra) of the adhesive layer is determined by scanning the surface of the laminated film with a non-contact three-dimensional surface roughness meter to measure the displacements of the surface of the film and analyzing the measured displacements with a surface-analyzing software.

The acrylic adhesive used is not limited to a particular kind but is preferably an adhesive that will be described below as an example, to satisfy the above characteristics. Although a solvent-based adhesive, an emulsion adhesive or the like is available as the acrylic adhesive, the solvent-based adhesive is particularly preferable to obtain the above adhesion property. As the acrylic solvent-based adhesive, the one obtained by solution polymerization is used to satisfy the above characteristics. As its materials, known materials for solution polymerization of an acrylic adhesive can be used. As the acrylic adhesive can be used copolymers comprising an acrylic ester, preferably acrylic $C_2$ to $C_8$ alkyl ester and more preferably acrylic $C_6$ to $C_8$ alkyl ester, a vinyl monomer having such a functional group as a hyroxyl group, epoxy group or carboxyl group, and copolymerizable vinyl monomers other than the above vinyl monomer. Examples of these include acrylic ester such as ethyl acrylate, butyl acrylate, 2-ethylhexyl acrylate and octyl acrylate. Examples of the comonomer for improving cohesion include vinyl acetate, acrylonitrile, styrene and methyl methacrylate. And examples of the monomer containing a functional group that makes increase a degree of crosslinking and have a low stable adhesion include methacrylic acid, acrylic acid, itaconic acid, hydroxyethyl methacrylate and glycidyl methacrylate. To make the acrylic adhesive have low adhesion and tackiness, and high cohesion, and to make achieve a high degree of crosslinking by using a variety of isocyanate curing agents, a monomer containing a large number of hydroxyl groups is particularly preferable. Further, in order to make the adhesive layer soft enough to prevent the production of air bubbles or the like when the surface protective film is stuck on a substrate having concave and convex on the surface, among the above components, a large amount of a main monomer component which has a low glass transition temperature (Tg) and forms the framework is used, and a small amount of a comonomer component which has a high Tg and improves cohesion is used.

The adhesive can be synthesized by a known method. For example, it can be synthesized by adding necessary materials into a reactor and heating the materials in the presence of an organic solvent such as ethyl acetate or toluene and a peroxide catalyst such as benzoyl peroxide or an azobis catalyst such as azobisisobutyronitrile to cause polymerization. To increase a molecular weight, a method in which the monomers are added at a time at the initial stage or a method using ethyl acetate rather than toluene, because toluene inhibits the growth of the polymer due to its large chain transfer coefficient, as an organic solvent is preferable. The weight-average molecular weight (Mw) is preferably 300,000 or larger, more preferably 400,000 or larger. When the Mw is smaller than 300,000, the adhesive cannot have sufficient cohesion even if crosslinked with the isocyanate curing agent, so that the surface protective film may fall immediately when the holding power of the adhesive is evaluated under loading or portions of the adhesive residues may remain on a stainless steel plate, polarizer or the like when the surface protective film is stuck on the stainless steel plate, polarizer or the like and peeled off them some time later. It is important to control the reaction at the polymerization stage for the purpose of increasing its molecular weight. In the case of the solvent-based adhesive, in general, a high molecular weight cannot be obtained while a sufficient adhesion can be obtained. Therefore, it is necessary for the purposes of increasing the molecular weight and the degree of crosslinking to control the amount of a curing agent to be added to the adhesive when the adhesive is used.

As the curing agent for the adhesive, an isocyanate curing agent, an epoxy curing agent, an alizarin curing agent and the like which are common curing agent can be used in the acrylic solvent-based adhesive. In order to obtain the adhesive power stabilized even if it was, after time passed, since an adhesion agent was stuck on basis material, it is desirable to use the hardening agent of a perfume fellows system. For example, the isocyanate curing agent is preferably an aromatic isocyanate curing agent such as toluylenediisocyanate (TDI) to obtain the stabilized adhesion even if it was, after time passed, since the adhesive was stuck on the substrate and to increase the hardness of the adhesive layer. This adhesive may contain additives such as a stabilizer, ultra-violet light absorber, flame retarder and antistatic agent. Further, to impart re-release characteristics to the adhesive and to keep its adhesion low and stable, the adhesive may contain organic resins, e.g., wax, or components having low surface energy such as silicone or fluorine in such amounts that they do not migrate into the substrate. For example, as the organic resin such as wax, a higher fatty acid ester or a low molecular weight phthalate ester may be used.

The adhesive solution may be coated on the polyester film (A) at any stage. Further, when the solution is coated on the polyester film (A), the adhesion between the adhesive and the polyester film (A) can be enhanced as required by subjecting the surface of the polyester film to physical surface treatment such as flame treatment, corona discharge treatment and plasma discharge treatment or to chemical surface treatment, in which an organic or inorganic resin coating is applied to the surface of the polyester film, during or after the production of the surface protective film as preliminary treatment for improving adhesion and coatability.

Any known method can be employed as a method for coating the adhesive. Preferable examples of such a method include die coating, gravure roll coating, blade coating, spray coating, air knife coating and dip coating. These methods can be used alone or in combination.

The adhesive can be coated on the polyester film (A) directly by any of the above coating method or can be coated and dried on a release film first and then transferred to the polyester film (A) by sticking the polyester film (A) onto the coated release film. To produce a surface protective film having a smoother adhesive layer surface, it is more preferable that the adhesive is first coated on a release film having a smooth surface and then transferred to the polyester film (A). The adhesive is preferably dried at the temperature that minimizes the amount of residual solvent. Although the drying temperature and drying time are not limited to particular temperature and time, the drying temperature is preferably 50° C. to 150° C. and the drying time is preferably 10 seconds to 5 minutes.

The adhesive must be aged because it has flowability. Further, when an isocyanate curing agent or the like is used as a crosslinking agent, since the reaction is not yet completed immediately after the adhesive is heated and dried, the adhesive must be aged in order to complete the reaction and to obtain a stable adhesion. In general, when the adhesive is heated at room temperature for at least about a week, it is preferably aged at a temperature of, for example, about 50° C. for at least three days. When the adhesive film is heated, the temperature should not be too high because the flatness of the base film may be damaged.

Protective Layer (C) Containing at Least One Agent Selected from Antistatic Agent and Release Agent The surface protective film of the present invention preferably has a layer containing an antistatic agent and/or a release agent formed on the surface of the polyester film, which the adhesive layer is formed on the other surface, for the purposes of protecting a TFT formed on a polarizer from damage by peeling charge, preventing shreds of the surface protective film and the adhesive from sticking on the surface of the surface protective film, and removing the stuck shreds and adhesive from the surface. The antistatic agent and the release agent may be mixed into one layer or form separate layers. Further, the antistatic agent may be mixed with the adhesive layer or formed between the adhesive layer and the polyester film.

The antistatic agent and the release agent preferably contain polymer compounds such as thermoplastic resins, e.g., thermoplastic polyester resin and acrylic resin, and thermosetting resins, e.g., thermosetting acrylic resin, urethane resin, melamine resin and epoxy resin, as a binder for the purpose of improving the strength of the layer and the adhesion on the biaxially oriented polyester film, water resistance, solvent resistance and anti-block properties of the layer. Further, the crosslinking agent particularly preferably contains at least one selected from methylolated or alkylolated melamine compounds, urea compounds and acrylamide compounds, epoxy compounds and polyisocyanate.

As the antistatic agent may be used a variety of surfactant type antistatic agents, e.g., antistatic agents having a cationic group such as quaternary ammonium salt, pyridinium salt and primary, secondary and tertiary amino groups, antistatic agents having a anionic group such as sulfonic acid salt, nitric ester salt and phosphoric ester salt, ampholytic antistatic agents such as amino acid type and amino sulfuric ester type, nonionic antistatic agents such as amino alcohol type, glycerine type and polyethylene glycol type; and antistatic agents obtained by polymerizing those listed above. Further, as the antistatic agent a conductive polymer such as a polyaniline, polypyrrole, polythiophene and a polymer in which tin or antimony type filler is dispersed may also be used. Furthermore, a layer of metal such as silver or tin may be formed by vapor phase deposition, vacuum evaporation, sputtering or plasma chemical vapor deposition.

The release agent preferably has a moderate peel force and durability because it must protect the surface of the surface protective film from dust. Illustrative examples of the release agent include silicone type, fluorine type and alkyl polymer type release agents. An alkyl polymer type release agent, which has particularly low migration, is particularly preferable for the purpose of preventing a stage from being contaminated.

To coat the antistatic agent or the release agent on the polyester film (A), they can be coated before crystalline orientation is completed at the time of producing the film or after the crystalline orientation is completed and the film is produced. They can be coated on the polyester film (A) by using any known method, as exemplified by roll coating, gravure coating, reverse roll coating and spray coating. These methods can be used alone or in combination.

The surface protective film of the present invention desirably has high transparency to facilitate inspection. More specifically, it preferably has a visible light transmittance of not less than 70% and a haze of not more than 10%. When the visible light transmittance is less than 70% and the haze is more than 10%, its transparency is so poor that it is concerned that particles may not be detected at the time of, for example, inspecting defects including particles when the surface protective film is stuck on a polarizer.

Release Film

The surface protective film in the present invention preferably takes a laminate structure including a release film (D)

for the purpose of protecting the adhesive layer of the surface protective film. Further, as the base film of the release film, a polyester film having the same constitution as that of the polyester film (A) used in the aforementioned surface protective film is preferably used.

A release layer is preferably formed on at least one of the surfaces of the release film. Illustrative examples of the components constituting the release layer include silicone resins, fluorine resins, aliphatic wax and olefin resins. Further, the release layer may not be formed depending on the type of the adhesive layer (B). Known additives may be added to the components constituting the release layer in such amounts that do not interfere with the objects of the present invention. Illustrative examples of the additives include ultraviolet light absorbers, pigments, antifoaming agents and antistatic agents. The release layer can be formed by coating a coating solution containing the components constituting the release layer on a base film and heating and drying the coated solution to form a coating film. The heating is carried out preferably at temperatures of 80 to 160° C. for 10 to 120 seconds, particularly preferably 120 to 150° C. for 20 to 60 seconds. The coating can be carried out by any known method. Preferable examples of such a coating method include roll coating and blade coating.

In the present invention, an adhesive layer is preferably formed between the base film and the release layer to improve the adhesion between a biaxially oriented polyester film which is the base film for the release film and the release layer. A component constituting this adhesive layer is preferably a silane coupling agent when the release layer is a silicone resin layer. This silane coupling agent is more preferably the one that is represented by a general formula Y—Si—$X_3$, in which Y is a functional group typified by an amino group, epoxy group, vinyl group, methacryl group and mercapto group and X is a hydrolyzable functional group typified by an alkoxy group. The thickness of the adhesive layer is preferably 0.01 to 5 $\mu$m, particularly preferably 0.02 to 2 $\mu$m. When the thickness of the adhesive film is within the above range, the adhesion between the base film and the release layer is good and the base film with the adhesive layer formed thereon hardly causes blocking, giving such an advantage that the handling of the release film hardly encounters problems.

Film Roll

The film roll of the present invention is obtained by rolling up a surface protective film, which comprises a polyester film (A), an adhesive layer formed on one surface of the polyester film (A) and a protective layer formed on the other surface of the polyester film (A), with the adhesive layer contacting (sticking to) the protective layer. The surface protective film is unrolled from the film roll and stuck on a substrate (such as a polarizer or stainless steel plate) to protect the surface of the substrate. When the substrate is to be processed or used for the application for which the substrate is intended, the surface protective film stuck is peeled off.

That is, the adhesive layer of the surface protective film must have such a property that it can be stuck to and peeled off from a surface (as of a protective layer, polarizer or stainless steel plate) easily. In order for the adhesive film to exhibit the property, the peel force required to peel the protective layer (C) off the adhesive layer (B) is preferably 10 mN/25 mm to 1,000 mN/25 mm.

When the peel force against the protective layer is less than 10 mN/25 mm, the surface protective film may not be rolled up neatly. On the other hand, when the peel force is more than 1,000 mN/25 mm, great tension is required when a wide film is unrolled, and such great tension requires large-scale facilities and increases peeling charge, whereby the surface of the film may be damaged.

EXAMPLES

The present invention will be further described with reference to examples hereinafter. It, however, is by no means limited to these examples. Physical properties in the examples were measured as follows.

(1) Critical Bounce Coefficient

The surface protective film is stuck on a glass plate in such a manner that the adhesive layer of the surface protective film contacts the glass plate, and they are left to stand at room temperature for 30 minutes. Thereafter, the glass plate is placed horizontally with the glass plate facing downward and the protective film facing upward, and an iron ball (having a density of 7.5 g/cm$^3$) is allowed to free-fall from 20 cm above the surface protective film onto the glass plate. A height H (cm) from the glass plate to the highest point that the rebounded ball has reached is measured. A bounce coefficient is calculated by dividing H by 20. Then, the same measurement is repeated using an iron ball having a different diameter (iron ball used for the ball tack specified in JIS Z-0237). After each bounce coefficient is plotted against the cube of the diameter of the iron ball, the diameter is extrapolated to zero to obtain a critical bounce coefficient.

(2) Dry Adhesion

The surface protective film is directly stuck on a washed stainless steel plate by rolling a rubber roller (under low load) on the film in such a manner that the adhesive layer of the surface protective film contacts the stainless steel plate. The rubber roller whose weight is 2 kg is made to roll, go and come back to a surface protection film top. Then, a rubber roller whose weight is 2 kg is rolled back and forth once across the surface protective film to make the film closely adhere to the plate. Thereafter, the resulting steel plate is left to stand for one day at a temperature of 23° C. and humidities of 55±5%RH, and a strip of 25 mm wide is cut out of the plate. The strip is mounted on a tensile tester (STROGRAPH, a product of Toyo Seiki Co., Ltd.), and the surface protective laminated film is pulled at an angle of 180° and a speed of 300 mm/min with the stainless steel plate fixed. The tensile strength at that point is taken as a dry adhesion.

(3) Adhesion and Its Rate of Change after One Week at 60° C.

After a strip of 25 mm wide sample prepared in the same manner as the strip for measuring the dry adhesion is left to stand at 60° C. for one week, the temperature is brought back to room temperature, at which the sample is left to stand for 30 minutes. Then, the strip is mounted on a tensile tester (STROGRAPH, a product of Toyo Seiki Co., Ltd.), and the surface protective film is pulled at an angle of 180° and a speed of 300 mm/min with the stainless steel plate fixed. The tensile strength at that point is taken as tack after one week. Further, its rate of change is determined by dividing this value by the value of the dry adhesion.

(4) Ball Tack

The adhesive layer of the surface protective film is mounted on a ball tack-measuring device and measured at a tilt angle of 300° C. in accordance with JIS Z-0237. The biggest size of the ball stopped on the adhesive layer is taken as a tack value.

(5) Holding Power

A piece of film having a width of 20 mm and a length of 100 mm is cut out of the surface protective film and stuck on a washed stainless steel plate in the same manner as in the dry adhesion measuring method. At this point, the size of the contact area between the surface protective film and the stainless steel plate is 20 mm×20 mm. The stainless steel plate is mounted and fixed on an automatic holding power-detecting tester (a product of Yuni Kougyou Co., Ltd.). At this point, the ambient temperature is set to be 80° C., and a 1 kg weight is hung on the surface protective film. The movement of the film after one hour is read and taken as a holding power.

(6) Evaluation of Adhesive Residues

A sample prepared in the same manner as the sample prepared for measuring the dry adhesion is left to stand at 80° C. for one week after stuck on a stainless steel plate. Thereafter, the laminated film is peeled off at a speed of 10 m/min. The adhesive residues on the stainless steel plate are observed and evaluated according to the following criterion.

◯: No adhesive residues are observed.

Δ: At least one adhesive residue of smaller than 1 mm$^2$ is observed in an area of 100 cm$^2$.

×: At least one adhesive residue of 1 mm$^2$ or larger is observed in an area of 100 cm$^2$.

(7) A Surface Roughness (Ra)

The surface roughness of the adhesive layer of the surface protective film is determined by scanning the surface of the adhesive layer of the surface protective film with a non-contact three-dimensional surface roughness meter to measure the displacements of the surface of the adhesive layer and analyzing the measured displacements with a surface-analyzing software to obtain a center line average surface roughness (Ra).

$$Ra = \sum_{k=1}^{m} \sum_{j=1}^{n} |Z_{jk} - \overline{Z}| / (m \cdot n)$$

$$\overline{Z} = \sum_{k=1}^{m} \sum_{j=1}^{n} Z_{jk} / (m \cdot n)$$

Further, the surface roughness of a plastic film to be used as a base film is determined by measuring the surface of the plastic film on which the adhesive layer is laminated in the same manner as the surface roughness of the adhesive layer is measured.

(8) A light Transmittance and a Haze

Light transmittance at a wavelength of 550 nm is measured using POIC HAZE METER SEP-HS-D1 manufactured by Nippon Seimitsu Kougaku Co., Ltd.

(9) The Number of Particles on Plastic Film

A sample having a length of 210 mm and a width of 148 mm (310.8 cm$^2$) is cut out of a plastic film, and the whole surface of the sample is inspected visually for particles by a cross-Nicol method. Then, the particles found on the sample film are observed by transmitted light under an optical microscope, and the largest diameter of the portions that are seen as optically abnormal portions is taken as the size of the particles. Further, when voids present around the particles are observed as optically abnormal portions, the size of the voids is added to the size of the particles. The particles are classified into those having a size of not smaller than 5 μm and smaller than 25 μm and those having a size of not smaller than 25 μm and counted.

(10) Number of Surface Defects

The obtained surface protective film is stuck on a polarizer, a sample having a length of 210 mm and a width of 148 mm (310.8 cm$^2$) is cut out of the plate, and projections on its surface that can be observed visually by the reflected light of a fluorescent lamp irradiating the surface are counted. As for the number of surface defects, a surface protective film having one or no defect is easy to inspect and extremely excellent, a surface protective film having two to five defects is not so easy to inspect in some portions but is still usable, and a surface protective film having 6 or more defects is difficult to inspect and no suitable as the surface protective film.

(11) Glass Transition Temperature (Tg)

The adhesive layer is solely formed into a sheet having a uniform thickness, and the sheet is measured at a frequency of 110 Hz and a heating rate of 3° C./min by using a dynamic viscous elasticity-measuring device (VIBRON, a product of A & D Co., Ltd.). The temperature at which a storage elastic modulus (E') sharply decreases and a maximum value of tan δ is obtained is taken as a glass transition temperature (Tg).

(12) The Tensile Elastic Modulus of Adhesive

The adhesive layer is solely formed into a sheet having a uniform thickness, and a strip of 10 mm wide is cut out of the sheet. The thickness of the strip is measured. Then, the strip is mounted on a tensile tester (STROGRAPH, a product of Toyo Seiki Co., Ltd.) and pulled at a speed of 5 mm/min to plot a stress-versus-distortion curve. The inclination of a tangent at the rise of the curve is determined and divided by the cross-sectional area to obtain a tensile elastic modulus.

(13) Surface Tension of Adhesive

Water (surface tension: 72.8 μN/cm or lower, non-polar components: 21.8 μN/cm, polar components: 51.0 μN/cm), ethylene glycol (surface tension: 48.0 μN/cm or lower, non-polar components: 29.0 μN/cm, polar components: 19.0 μN/cm), and diiodomethane (surface tension: 50.8 μN/cm or lower, non-polar components: 50.8 μN/cm, polar components: 0 μN/cm) are dropped on the surface of the adhesive, and contact angles by these solutions are measured. The surface tension of the adhesive is calculated from these components by using an extended Forkes formula.

(14) Peel Force

The surface of the adhesive layer of the surface protective film is directly stuck on the surface of the protective layer of the same surface protective film by rolling a rubber roller weighing 2 kg back and forth once across the surface protective film to make the adhesive layer closely adhere to the protective layer. Thereafter, the resulting surface protective films are left to stand for 30 minutes at a temperature of 23° C. and humidities of 55±5%RH, and a strip of 25 mm wide is cut out of the film. The strip is mounted on a tensile tester (STROGRAPH, a product of Toyo Seiki Co., Ltd.), and one of the surface protective films is pulled at an angle of 180° and a speed of 300 mm/min with the surface of the other surface protective film fixed. The tensile strength at that point is taken as a peel force.

(15) The Birefringence

The refractive index in the machine (length) direction of the film ($N_{MD}$) and the refractive index in the transverse (width) direction of the film ($N_{TD}$) are measured using Abbe refractometer, and the difference between them ($N_{TD}-N_{MD}$) is taken as birefringence (Δn).

(16) Crossed Nicols Method

The laminate of the present invention is stuck on a polarizer of good quality to conduct inspection by a crossed Nicols method. The sticking is carried out by reproducing the process actually performed, in which the machine direction of the biaxially oriented film matches the orientation axis of the polarizer. Evaluation is made according to the following criterion.

Excellent: The formed base film has almost no light interference speckles across its width and is extremely excellent.

Good: The formed base film has some light interference speckles at both sides in its width direction and is mostly excellent enough to be usable.

Acceptable: The formed base film has no light interference speckles in the central portion in its width direction and is usable.

(17) Appearance of Air Bubbles After Stuck on a Polarizer Having an Ra of 300 μm The surface of the adhesive layer of the surface protective film is directly stuck on a polarizer having a surface roughness (Ra) of 300 μm by a rubber roller. Then, a rubber roller weighing 2 kg is rolled back and forth once across the surface protective film to make the film adhere to the plate. The surface of the surface protective film is observed visually and evaluated according to the following criterion.

○: Less than one air bubble having an average diameter of not smaller than 1 mm in an area of 210 mm×148 mm (310.8 cm$^2$)

Δ: One to five air bubbles having an average diameter of not smaller than 1 mm in an area of 210 mm×148 mm (310.8 cm$^2$)

×: More than five air bubbles having an average diameter of not smaller than 1 mm in an area of 210 mm×148 mm (310.8 cm$^2$)

Example 1

A polyethylene terephthalate polymer which contained 0.1 wt % of spherical silica particles having an average particle diameter of 0.15 μm and which had an intrinsic viscosity of 0.62 was molten in an extruder, extruded from a die onto a rotating cooling drum kept at 40° C. and closely adhered to the surface of the drum by static adhesion to be quenched and formed into an unstretched film. Then, the unstretched film was stretched 3.5 times in the machine direction and then 3.6 times in the transverse direction and finally heat-set at 220° C. to obtain a biaxially oriented polyethylene terephthalate film (A) having a thickness of 50 μm and a birefringence of 0.01, which was to be used as the base film of a surface protective film.

Further, a biaxially oriented polyethylene terephthalate film for a release film was obtained in the same manner as the above biaxially oriented polyethylene terephthalate film was obtained except that the thickness was changed to 38 μm. Then, a coating solution obtained by dissolving an addition reaction-type curable silicone comprising polydimethylsiloxane having a vinyl group and dimethyl hydrogensilane in a toluene solvent in such an amount that the solid content of the resulting solution should be 2% and adding a platinum catalyst to the solution was coated on one of the surfaces of the biaxially oriented polyethylene terephthalate film for a release film in an coating amount of 6 g/m$^2$ (wet) and then heated at 140° C. for one minute to be dried and cured. Thus, a release film (D) having a 0.1-μm-thick release layer was prepared.

Next, as an acrylic adhesive, a polymer for an adhesive having a weight-average molecular weight of about 450,000 was prepared by solution-polymerizing 2-ethylhexyl acrylate as a main monomer, vinyl acetate as a comonomer and hydroxyethyl methacrylate as a functional group-containing monomer in a ratio of 7:2:1 in the presence of ethyl acetate as a solvent and azobisisobutyronitrile as a reaction catalyst. Then, 5 parts of TDI-based isocyanate crosslinking agent were added to 100 parts of the polymer for the adhesive, and this mixture was coated on the surface of the release layer of the above release film in such an amount that the polymer should have a thickness of 20 μm after dried. Thus, an adhesive layer was formed.

Then, a surface protective film on which the release film (D) was laminated was obtained by subjecting one of the surfaces of the biaxially oriented polyethylene terephthalate film (A) to be used as the base film of the above surface protective film to corona treatment, sticking the adhesive layer of the release film on which the above adhesive layer had been formed to the corona-treated surface of the film and aging the resulting films at 60° C. for three days. The properties of the obtained surface protective film are shown in Table 1.

Comparative Example 1

A surface protective film was prepared in the same manner as in Example 1 except that the polymer for the adhesive was changed to the one prepared by solution-polymerizing 2-ethylhexyl acrylate as a main monomer, vinyl acetate as a comonomer and hydroxyethyl methacrylate as a functional group-containing monomer in a ratio of 4:4:2 in the presence of ethyl acetate as a solvent and azobisisobutyronitrile as a reaction catalyst and having a weight average molecular weight of about 300,000 and that the TDI-based isocyanate crosslinking agent and its amount were changed to an aziridine-based isocyanate crosslinking agent and 30 parts. The properties of the obtained surface protective film are shown in Table 1.

Comparative Example 2

A surface protective film was prepared in the same manner as in Comparative Example 1 except that the thickness of the adhesive layer was changed to 2 μm. The properties of the obtained surface protective film are shown in Table 1.

Comparative Example 3

A sample was prepared in the same manner as in Example 1 except that the biaxially oriented polyethylene terephthalate film to be used as the base film of the surface protective film was changed to a polyethylene film obtained by forming a polyethylene resin having a density of 0.925 and a melt index of 2.5 into a 50-μm-thickness film by inflation and subjecting the film to corona treatment. The properties of the obtained surface protective film are shown in Table 1.

Example 2

A surface protective film was prepared in the same manner as in Example 1 except that the polymer for the adhesive was changed to the one prepared by solution-polymerizing 2-ethylhexyl acrylate as a main monomer, methyl acrylate as a comonomer and hydroxyethyl methacrylate as a functional group-containing monomer in a ratio of 3:1:1 in the presence of ethyl acetate as a solvent and azobisisobutyronitrile as a reaction catalyst and having a weight-average molecular weight of about 450,000. The properties of the obtained surface protective film are shown in Table 1.

Comparative Example 4

A surface protective film was prepared in the same manner as in Example 2 except that the polymer for the adhesive was changed to the one prepared by solution-polymerizing 2-ethylhexyl acrylate as a main monomer, butyl acrylate and methyl acrylate as comonomers and hydroxyethyl methacrylate as a functional group-containing monomer in a ratio of 4:4:1:1 in the presence of ethyl acetate/toluene (mixing ratio: 1/1) as a solvent and azobisisobutyronitrile as a reaction catalyst and having a weight-average molecular weight of about 200,000 and that the amount of the TDI-based isocyanate crosslinking agent was changed to 1 part. The properties of the obtained surface protective film are shown in Table 1.

This surface protective film left adhesives when stuck on and peeled off a stainless steel plate. Therefore, although it was excellent in defect-inspectability, it was not suitable as a surface protective film in consideration of particles remaining on a product.

silica particles having an average particle diameter of 0.5 $\mu$m were added to a polyethylene terephthalate polymer to be formed into the base film of the release film. Since the obtained surface protective film had larger projections on the surface of the release film, the adhesive layer could not be formed uniformly. Therefore, the surface protective film had as many as 8 surface defects in an area of 310.8 $cm^2$, the surface protective film was not suitable for actual use.

Example 3

A biaxially oriented polyethylene terephthalate film to be used as the base film of the surface protective film was obtained in the same manner as in Example 1, and corona

TABLE 1

|  |  | Ex.1 | C.Ex.1 | C.Ex.2 | C.Ex.3 | Ex.2 | C.Ex.4 |
|---|---|---|---|---|---|---|---|
| Plastic film used as base film |  | PET | PET | PET | PE | PET | PET |
| Critical bounce coefficient |  | 0.4 | 0.7 | 0.6 | 0.3 | 0.4 | 0.6 |
| SUS dry adhesion | mN/25 mm | 120 | 80 | 20 | 110 | 100 | 800 |
| SUS adhesion after one week at 60° C. | mN/25 mm | 140 | 100 | 40 | 130 | 120 | 1,800 |
| Rate of change in adhesion |  | 1.2 | 1.3 | 2.0 | 1.2 | 1.2 | 2.3 |
| Ball tack | /32 in. | 4 | 1 | 2 | 4 | 4 | 14 |
| Holding power | mm | 0 | 0 | 0 | 0 | 0 | 3 |
| Adhesive residue |  | ○ | ○ | ○ | ○ | ○ | X |
| Surface roughness of adhesive layer | nm | 25 | 23 | 22 | 550 | 25 | 26 |
| Light transmittance/Haze | %/% | 85/6 | 82/7 | 82/7 | 65/12 | 85/6 | 82/7 |
| Surface roughness of plastic film used as base film | nm | 20 | 20 | 20 | 650 | 20 | 20 |
| Number of particles on surface protective film |  |  |  |  |  |  |  |
| 25 $\mu$m or larger |  | 0 | 0 | 0 | 15 | 0 | 0 |
| Smaller than 25 $\mu$m |  | 3 | 4 | 4 | 10 | 3 | 4 |
| Number of defects on surface |  | 0 | 0 | 0 | 18 | 0 | 0 |
| Glass transition temperature (Tg) of adhesive layer | ° C. | −45 | −19 | −45 | −45 | −40 | −55 |
| Modulus in tension of adhesive layer | MP | 0.18 | 0.21 | 0.18 | 0.18 | 0.19 | 0.14 |
| Surface tension of adhesive layer | $\mu$N/cm | 23 | 10 | 23 | 23 | 18 | 26 |
| Appearance of air bubbles after stuck on polarizer having Ra of 300 $\mu$m |  | ○ | X | ○ | ○ | ○ | ○ |

Ex.: Example, C.Ex.: Comparative Example

In Table 1, "PET" represents a polyethylene terephthalate and "PE" represents a polyethylene.

As is clear from Table 1, the surface protective films of the present invention presented in the examples have an adhesive layer which can be peeled off easily after stuck on a substrate, which has a peel force that does not increase with time and which has no liftings caused by the air bubbles trapped when stuck on a substrate having a rough surface, and are highly transparent so that the inspectability of the substrate on which they have been stuck is not impaired. To the contrary, the surface protective film of Comparative Example 1 had liftings caused by the air bubbles or the like trapped when stuck on a substrate having a rough surface, the sides of the surface protective film of Comparative Example 2 curled up after the film was stuck, and the surface protective film of Comparative Example 3 had poor inspectability because it contained many particles.

Reference Example 1

A surface protective film was obtained in the same manner as in Example 2 except that 0.5 wt % of spherical silica particles having an average particle diameter of 0.5 $\mu$m were added to a polyethylene terephthalate polymer to be formed into the base film of the release film. Since the obtained surface protective film had large projections on the surface of the release film, the adhesive layer could not be formed uniformly. Therefore, the surface protective film had as many as 10 surface defects in an area of 310.8 $cm^2$, the surface protective film was not suitable for actual use.

Reference Example 2

A surface protective film was obtained in the same manner as in Example 2 except that 0. 5 wt % of spherical treatment was given to both sides of this film. Then, an antistatic layer as a protective layer was formed on one of the surfaces of this film and a release layer was then formed on the antistatic layer. The antistatic layer was formed by applying a 3% aqueous coating solution comprising 30 parts of thiophene derivative polymer, 70 parts of interpolyester (comprising 60 mol % of terephthalic acid, 35 mol % of isophthalic acid and 5 mol % of adipic acid as dicarboxylic acid components and 95 mol % of ethylene glycol and 5 mol % of diethylene glycol as glycol components) and 5 parts of nonionic surfactant such that the solution should be formed into a coating film having a thickness of 0.15 $\mu$m after dried. The release layer was formed by applying a coating solution obtained by mixing 40 parts of polyethyleneimine octadecyl carbamate (RP-20, a product of Nippon Syokubai Co., Ltd.) and 100 parts of polyester resin (ESPEL. 1510, a product of Hitachi Chemical Co., Ltd.) and 30 parts of melamine resin (NIKARAC NS-11, a product of Sanwa Chemical Co., Ltd.) as binder components as in the case of the antistatic layer such that the applied solution should be formed into a release layer having a thickness of 0.2 $\mu$m after heated at 140° C. for one minute to be dried and cured.

Then, as an acrylic adhesive, a polymer for the adhesive having a weight-average molecular weight of about 450,000 was prepared by solution-polymerizing 2-ethylhexyl acrylate and n-butyl acrylate as main monomers, vinyl acetate as a comonomer and hydroxyethyl methacrylate as a functional group-containing monomer in a ratio of 4:3:2:1 with 0.5 parts of epoxy-modified stearyl acrylate added to 10 parts of all these monomers in the presence of ethyl acetate as a solvent and azobisisobutyronitrile as a reaction catalyst. Then, 20 parts of aziridine-based isocyanate crosslinking agent were added to 100 parts of the polymer for the adhesive, and the resulting polymer was coated on the surface of the biaxially oriented polyethylene terephthalate film, the surface was the reverse side of side which had formed the protective layer, such that the polymer should have a thickness of 20 μm after dried. The coated polymer was dried at 100° C. for 2 minutes, rolled up, and aged at 45° C. for one week to obtain a film roll. The properties of the obtained film roll are shown in Table 2.

Reference Example 3

In the same manner as in Example 3 except that the release layer was not formed, the adhesive was coated on the surface by the side of opposite with the surface in which the antistatic layer had been formed, then the film was rolled up. The properties of the obtained film roll are shown in Table 2.

TABLE 2

|  |  | Ex.3 | R.Ex.3 |
| --- | --- | --- | --- |
| Plastic film used as base film |  | PET | PET |
| Critical bounce coefficient |  | 0.4 | 0.4 |
| SUS dry adhesion | mN/25 mm | 120 | 130 |
| SUS adhesion after one week at 60° C. | mN/25 mm | 140 | 150 |
| Rate of change in adhesion |  | 1.2 | 1.2 |
| Ball tack | /32 in. | 4 | 4 |
| Holding power | mm | 0 | 0 |
| Adhesive residue |  | ◯ | ◯ |
| Surface roughness (Ra) of adhesive layer | nm | 24 | 100 |
| Number of defects on surface |  | 0 | 0 |
| Glass transition temperature (Tg) of adhesive layer | ° C. | −40 | −40 |
| Modulus in tension of adhesive layer | MP | 0.18 | 0.18 |
| Surface tension of adhesive layer | μN/cm | 20 | 20 |
| Peel force of surface of adhesive layer against surface of protective layer | mN/25 mm | 150 | 1,100 |
| Appearance of air bubbles after stuck on polarizer having Ra of 300 μm |  | ◯ | X |

Ex.: Example, R.Ex.: Reference Example

In Table 2, "PET" represents a polyethylene terephthalate.

As is clear from Table 2, the film roll of the present invention presented in the example has an adhesive layer which has a peel force that does not increase with time, which can be peeled off easily after stuck on a substrate and which has no liftings caused by the air bubbles or the like trapped when stuck on a substrate having a rough surface; has good inspectability to the substrate on which it has been stuck because it is highly transparent; and can be peeled off the surface of the protective layers easily. To the contrary, in the case of the film roll of Reference Example 3, the adhesive layer (B) is not easily peeled off the surface of the protective layer, the surface of the adhesive layer (B) is roughened when peeled off, and air bubbles are seen when the film is stuck on a polarizer of a substrate.

Example 4

A laminated film was prepared in the same manner as in Example 1 except that the base film of the protective film was changed to a biaxially oriented film obtained by stretching an unstretched film 1.5 times in the machine direction and 4.3 times in the transverse direction and having a birefringence of 0.10. The obtained laminated film had the same properties as that of Example 1. Further, when the film was stuck on a polarizer of good quality and inspected by a crossed Nicols method, almost no light interference speckles were found across the formed base film. Therefore, the laminated film was extremely excellent. To the contrary, in the case of the above laminated films of Examples 1 to 3, some light interference speckles were found on both sides in the width direction of the formed base films. However, most of the base films were usable and excellent.

What is claimed is:

1. A surface protective film for protecting the surface of a substrate, which comprises a polyester film (A) and an adhesive layer (B) formed on one of the surfaces of the polyester film (A), which adhesive layer has a critical bounce coefficient of not more than 0.5, wherein the adhesive layer (B) satisfies all of the following conditions:

(1) the dry adhesion against a stainless steel plate is 30 to 500 mN/25 mm;
   (2) the rate of change in the dry adhesion after being kept stuck at 60° C. for a week is 0.5 to 2.0 times;
   (3) the size of a ball used in ball tack measurement is 2/32 to 10/32 inches;
   (4) the thickness of the adhesive layer (B) is 3 to 50 μm;
   (5) the adhesive layer (B) has a center line average surface roughness (Ra) of 2 to 500 nm.

2. The surface protective film of claim 1, when the adhesive layer (B) and a stainless steel plate are stuck so that the area of the portion to which the adhesive layer (B) contacts the stainless steel plate may be 20 mm×20 mm and 1 kg load is applied in the direction along the stuck surface at 80° C. for 1 hour, the movement of the adhesive layer (B) from the stainless steel plate is 0 to 1 mm.

3. The surface protective film of claim 1, wherein when the adhesive layer (B) has been stuck on the stainless steel plate at 80° C. for week and then peeled off, the adhesive residues of 1 mm² or larger in an area of 100 cm² on the surface of a stainless steel plate is 0.

4. The surface protective film of claim 1, wherein the adhesive layer has a glass transition temperature of −60 to −20° C., a modulus in tension of 0.1 to 0.2 MPa and a surface tension of 15 to 25 μN/cm.

5. The surface protective film of claim 1, which further has a protective layer (C), which contains at least one agent selected from the group consisting of an antistatic agent and a release agent, formed on the surface of the polyester film (A) by the side of opposite with the surface in which the adhesion layer (B) has formed.

6. The surface protective film of claim 5, wherein the peel force of the protective layer (C) against the adhesive layer (B) is 10 to 1,000 mN/25 mm.

7. The surface protective film of claim 1, wherein the polyester film (A) is a monoaxially or biaxially oriented film.

8. The surface protective film of claim 7, wherein the difference ($N_{TD}-N_{MD}$) between the refractive index in the transverse direction ($N_{TD}$) and the refractive index in the machine direction ($N_{MD}$) of the biaxially oriented polyester film (A) is larger than –0.08 and smaller than 0.08.

9. The surface protective film of claim 7, wherein the difference ($N_{TD}-N_{MD}$) between the refractive index in the transverse direction ($N_{TD}$) and the refractive index in the machine direction ($N_{MD}$) of the polyester film (A) is 0.08 or larger.

10. The surface protective film of claim 1, wherein the polyester film (A) has a center line average surface roughness (Ra) of 2 to 500 nm and has no particles of 25 μm or larger and 10 or less particles of not smaller than 5 μm and smaller than 25 μm in an area with a length of 148 mm of the neighborhood which intersects perpendicularly with a length of 210 mm of one side (310.8 cm$^2$).

11. The surface protective film of claim 1, which has a visible light transmittance of not lower than 70%.

12. The surface protective film of claim 1, which has a haze of not higher than 10%.

13. The surface protective film of claim 1, wherein the adhesive layer (B) has a release film (D) comprising a biaxially oriented polyester film on its surface by the side of opposite of the surface where the adhesion layer (B) has been contact with the polyester film (A).

14. The surface protective film of claim 13, wherein the release film (D) has a center line average surface roughness (Ra) of 2 to 500 nm and has no particles of 25 μm or larger and 10 or less particles of not smaller than 5 μm and smaller than 25 μm in an area with a length of 148 mm of the neighborhood which intersects perpendicularly with a length of 210 mm of one side (310.8 cm$^2$).

15. The surface protective film of claim 13, wherein a release layer comprising at least one release agent selected from the group consisting of a silicone resin, a fluorine resin and an aliphatic wax, formed on the surface where the release film (D) has been contact with the adhesion layer (B).

16. A film roll having the form of the roll which the surface protective film according to claim 1 is rolled round with the adhesive layer (B) contacting directly the protective layer (C).

17. A method for protecting a surface of a substrate, which comprises applying the surface protective film of any one of claim 1, 5, or 13 to the surface of a substrate selected from the group consisting of a polarizer, a diffusing plate, a translucent reflector, an optical retardation film and a viewing angle-widening film.

18. A method for protecting a surface of a substrate, which comprises unwinding from the film roll of claim 16 the surface protective film and applying said surface protective film to the surface of a substrate selected from the group consisting of a polarizer, a diffusing plate, a translucent reflector, an optical retardation film and a viewing angle-widening film.

* * * * *

(12) EX PARTE REEXAMINATION CERTIFICATE (5474th)
United States Patent
Sumi

(10) Number: US 6,582,789 C1
(45) Certificate Issued: Aug. 8, 2006

(54) SURFACE PROTECTIVE FILM AND LAMINATE FORMED THEREFROM

(75) Inventor: Hiroyuki Sumi, Sagamihara (JP)

(73) Assignee: Teijin Limited, Osaka (JP)

Reexamination Request:
No. 90/007,433, Feb. 23, 2005

Reexamination Certificate for:
Patent No.: 6,582,789
Issued: Jun. 24, 2003
Appl. No.: 09/857,289
Filed: Jun. 1, 2001

(22) PCT Filed: Sep. 28, 2000

(86) PCT No.: PCT/JP00/06713
§ 371 (c)(1),
(2), (4) Date: Jun. 1, 2001

(87) PCT Pub. No.: WO01/25363
PCT Pub. Date: Apr. 12, 2001

(30) Foreign Application Priority Data
Oct. 1, 1999 (JP) ............................................. 11-281440

(51) Int. Cl.
*C09J 7/02* (2006.01)

(52) U.S. Cl. ..................... 428/40.1; 428/1.1; 428/40.2; 428/40.5; 428/41.3; 428/41.4; 428/41.5; 428/41.7; 428/41.8; 428/480; 428/906; 428/918

(58) Field of Classification Search ....................... None
See application file for complete search history.

(56) References Cited

U.S. PATENT DOCUMENTS

| | | | |
|---|---|---|---|
| 3,406,820 A | 10/1968 | Bond | |
| 4,115,617 A | 9/1978 | Mitsuishi et al. | |
| 4,151,328 A | 4/1979 | Kight | |
| 5,591,522 A | 1/1997 | Sakai et al. | |

FOREIGN PATENT DOCUMENTS

| | | | |
|---|---|---|---|
| EP | 0 874 015 | * | 10/1998 |
| EP | 0 927 752 A1 | | 7/1999 |
| JP | 8-259914 | * | 10/1996 |
| JP | 9-254307 | * | 9/1997 |
| JP | 9-267449 | * | 10/1997 |
| JP | 11-070629 | * | 3/1999 |
| JP | 11-291411 | * | 10/1999 |
| WO | WO 99/03944 | | 1/1999 |

OTHER PUBLICATIONS

Supplementary Partial European Search Report.

\* cited by examiner

*Primary Examiner*—Jerry D Johnson

(57) ABSTRACT

A surface protective film which can be used in the production of components associated with a liquid crystal display such as a polarizer to improve productivity and yields since no air bubbles are trapped when stuck to a substrate having unevenness in the surface and since the adhesion is low and a change of the adhesion with the passage of time is small and which can be highly transparent and improve inspectability by using a polyester film having little particles as a base material. It is treated by an antistatic agent or a release agent the surface of the surface protective film opposite to the surface in which the adhesive layer is formed, as a result, control of static electrification in case the surface protective film is peeled off and removal of the dust adhering to the surface can be made easy.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

* * * * *